United States Patent
Congialosi

(10) Patent No.: US 6,729,064 B2
(45) Date of Patent: May 4, 2004

(54) DEVICE FOR HOLDING AN ICE FISHING ROD

(76) Inventor: Jack L. Congialosi, 49738 Verschave, New Baltimore, MI (US) 48047

( * ) Notice: Subject to any disclaimer, the term of this patent is extended or adjusted under 35 U.S.C. 154(b) by 0 days.

(21) Appl. No.: 10/118,114

(22) Filed: Apr. 6, 2002

(65) Prior Publication Data

US 2003/0188472 A1 Oct. 9, 2003

(51) Int. Cl.[7] .......................... A01K 97/00; A01K 97/10
(52) U.S. Cl. .................. 43/21.2; 224/200; 224/920; 224/922
(58) Field of Search ................ 43/21.2; 224/200, 224/920, 922

(56) References Cited

U.S. PATENT DOCUMENTS

| 4,529,112 | A | * | 7/1985 | Miller | 43/21.2 |
|---|---|---|---|---|---|
| 5,813,162 | A | * | 9/1998 | Tse | 43/21.2 |
| 5,956,883 | A | * | 9/1999 | Krouth | 43/21.2 |
| 6,003,746 | A | * | 12/1999 | Richardson | 224/200 |
| 6,260,746 | B1 | * | 7/2001 | Abdi | 43/21.2 |
| 6,267,276 | B1 | * | 7/2001 | Cook | 224/183 |
| 6,269,990 | B1 | * | 8/2001 | Gray | 224/200 |
| 6,357,639 | B1 | * | 3/2002 | Williams | 224/200 |

* cited by examiner

*Primary Examiner*—Kurt Rowan
(74) *Attorney, Agent, or Firm*—Gregory T. Zalecki

(57) ABSTRACT

A device for holding an ice fishing rod is disclosed. The device is comprised of a rod holder, a base and a strap. The rod holder is shaped to hold an ice fishing rod, at the handle of the ice fishing rod, in a substantially horizontal position. The base is shaped to fit the thigh of a fisherman. Preferably, the base is a container with a hinged lid, the container having a plurality of compartments to hold fishing bait and fishing lures. The strap is attached to the base and is of sufficient length to fit around the thigh of the fisherman. Preferably, the strap has a buckle at each end. This device is intended to be strapped to the thigh of a seated ice fisherman. An ice fishing rod may be inserted into the rod holder. The fisherman may fish and tend to bait or lures at the end of his or her fishing rod hands-free.

4 Claims, 5 Drawing Sheets

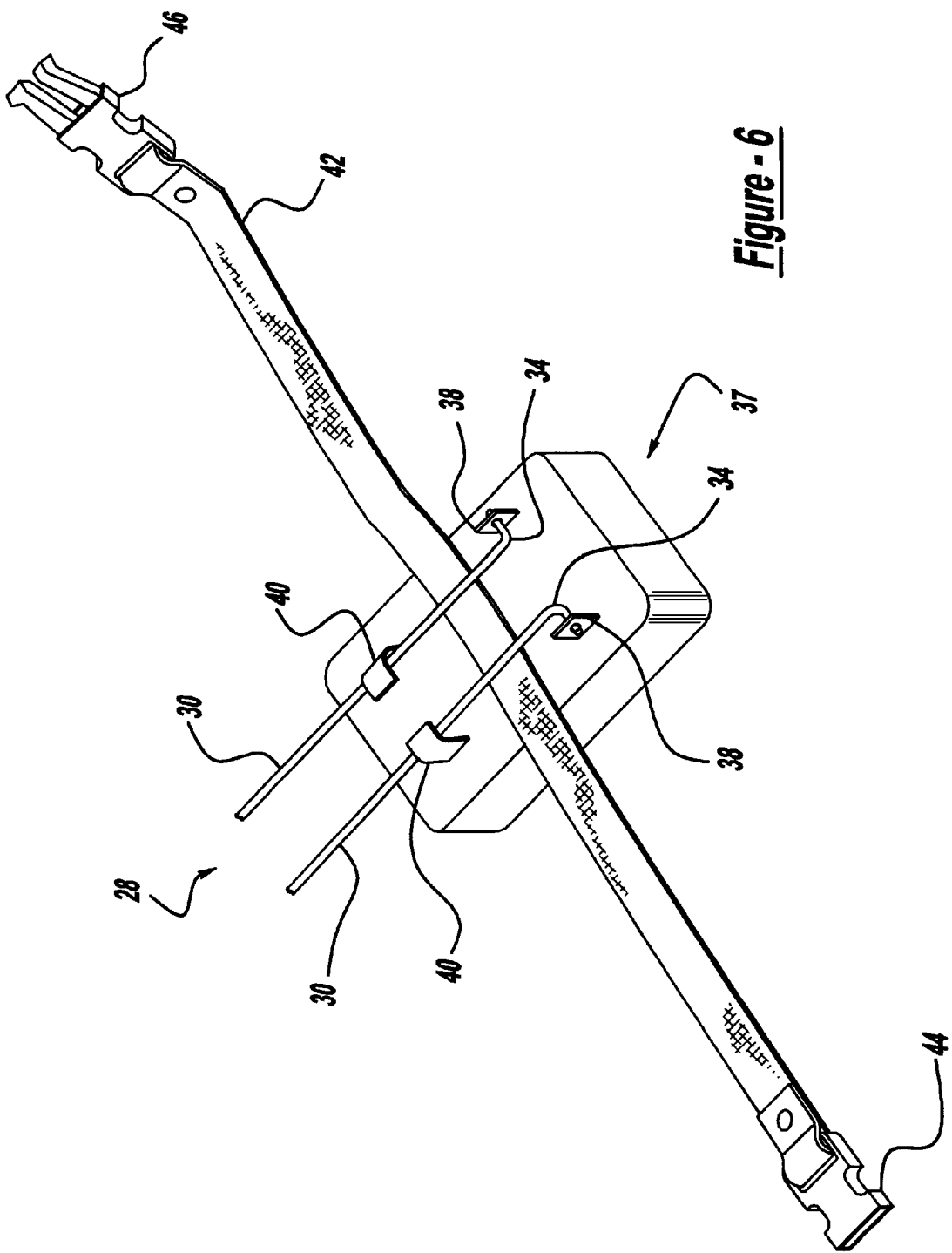

DEVICE FOR HOLDING AN ICE FISHING ROD

BACKGROUND

Many people engage in the sport of ice fishing. The principal difference between ice fishing and traditional fishing is that the fishing takes place upon an ice covered body of water, rather than a non ice covered body of water. The ice fisherman locates a spot where he desires to fish. There he cuts a hole into the ice with an augur or spud. He then places bait or a lure onto the end of the fishing line attached to his fishing rod. Next he drops the fishing line into the water while holding the fishing rod by hand. Typically, the fisherman sits on a bucket while ice fishing.

An ice fishing rod is significantly shorter than other types of fishing rods.

Most ice fisherman use one of two methods to fish. They either hold the ice fishing rod by hand while optionally jigging the rod, or, they lay the rod on the ice until a fish bites. When the rod is not being held by hand it can be placed into and secured by a rod holder. Typically, the rod holder is placed upon the ice or attached to a bucket sitting on the ice.

The object of ice fishing is to catch fish. When a fish bites, the hook needs to be set. The hook is set by grabbing the rod and making a quick upward movement of the front rod tip. If the rod is on the ice or within an ice-based rod holder, the rod must first be retrieved from that location. After the hook is set, the fish is retrieved and removed from the hook. This can be a difficult process because two hands are required to remove the fish, leaving no hands to manipulate the rod.

After the fish is removed from the hook, the hook must be re-baited. Two hands are required to manipulate the bait and the hook. This process is made difficult by the fact that the fisherman has no hands available to hold the fishing rod while placing the bait on the hook.

If the fishing rod could be secured to the lower thigh of the fisherman while he is fishing or baiting the hook, much would be gained in terms of convenience and speed. The fatigue caused by constantly holding the rod while fishing would be eliminated. Some people have difficulty bending down to pick up a fishing rod laying on the ice or within a rod holder. This difficulty is eliminated by securing the fishing rod to the lower thigh of the fisherman.

Most fishermen desire quick access to their fishing rod. They want to quickly set the hook when a fish bites. They also want quick access to the rod for changing bait or lures.

It is desirable for the fisherman to be able to use both hands when baiting the hook or changing the lure. This is difficult to accomplish when his hands must be used to hold or manipulate the fishing rod at the same time.

It is desirable to get the fishing line and hook back in the water as fast as possible after a fish is caught. This is because the fisherman may have only a small window of time to catch numerous fish while a school of fish is passing by. The time that the hook is out of the water is minimized when the fishing rod is secured to the lower thigh of the fisherman.

If the fishing rod is secured near the fisherman, the fisherman will be able to keep his hands warm by putting them into his pockets. Also, a fishing rod secured to the lower thigh of the fisherman allows the fisherman to jig with his leg instead of his hands.

There is a need for a hands-free ice fishing rod holder which can be secured to the lower thigh of the fisherman. There is also a need for a hands-free ice fishing rod holder which can be secured to the lower thigh of the fisherman which, in addition to holding the fishing rod, holds a container for bait, tackle and lures. Additionally, there is a need for a hands-free ice fishing rod holder which can be secured to the lower thigh of the fisherman and which can be positioned at various positions on the leg of the fisherman. This will allow the fishermen to move his body without disturbing the alignment between his fishing line and the hole in the ice.

SUMMARY

The present invention is directed to a device for holding an ice fishing rod which satisfies these needs. The device is comprised of a rod holder, a base and a strap. The rod holder is shaped to hold an ice fishing rod. Ice fishing rods have a handle at one end. The rod holder is shaped to hold the ice fishing rod, at the handle of the ice fishing rod, in a substantially horizontal position. Thus, if an ice fisherman is in a seated position with the rod holder and an ice fishing rod inserted into the rod holder, laying on top of his or her lower thigh, the rod holder and the ice fishing rod will project out from the fisherman's knee horizontally.

The base is shaped to fit the anterior lower thigh of the fisherman. The base is attached to the rod holder such that the base and the rod holder are substantially coplanar. A strap of sufficient length to fit around the lower thigh of the fisherman is attached to the base. Preferably, the strap has a buckle at each end for securing the strap to the lower thigh of the fisherman.

Preferably, the base is a container with a hinged lid, the container having a plurality of compartments to hold fishing bait and fishing lures. This will allow the fisherman to store bait and lures within the container.

The preferred version of the rod holder is comprised of two siderails, a front support member and a rod alignment member. The siderails are aligned to be substantially parallel to each other. The front support member is shaped to receive an ice fishing rod handle. The front support member is attached to one end of each siderail. The other end of each siderail has an ear formed onto it. The ears are shaped to allow each siderail to be attached to a bracket. The rod alignment member is shaped to secure the ice fishing rod handle near the distal end of the handle. The rod alignment member is attached to the siderails such that the siderails, the front support member and the rod alignment member will securely hold an ice fishing rod, at the handle of the fishing rod, in a substantially horizontal position.

In the preferred version of this invention a rear bracket is attached to one end of the bottom side of the container. The rear bracket is adapted to receive the ears of the siderails. The ears of the siderails are inserted into the rear bracket. A front bracket is attached to the other end of the bottom of the container. The front bracket secures the rod holder to the container and aligns the rod holder and the bottom of the container in a substantially coplanar configuration. The rear bracket, front bracket and container may be one integral piece. Such an integral piece may be manufactured by using plastic injection molding to construct a one-piece container, rear bracket and front bracket.

DRAWINGS

These and other features, aspects, and advantages of the present invention will become better understood with regard to the following description, appended claims, and accompanying drawings where:

FIG. 6 is a bottom view of the device for holding an ice fishing rod of FIG. 2 showing the rod holder inserted into the front and rear brackets of the container and the strap positioned between the rod holder and the container.

DESCRIPTION

Figure 1:
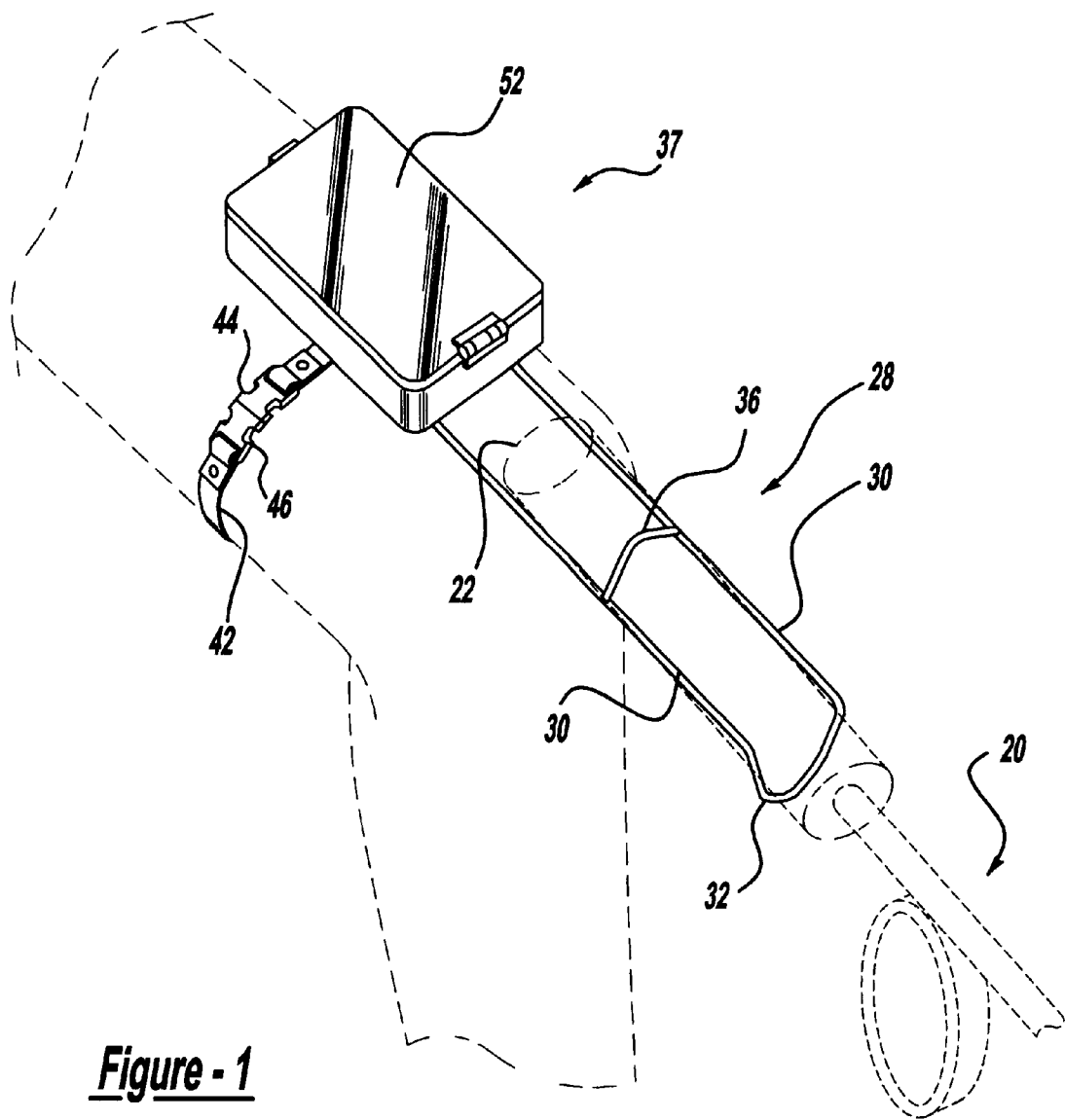
FIG. 1 is a perspective view of a device for holding an ice fishing rod strapped to the anterior lower thigh of a fisherman with an ice fishing rod inserted into the device.
Figure 2:
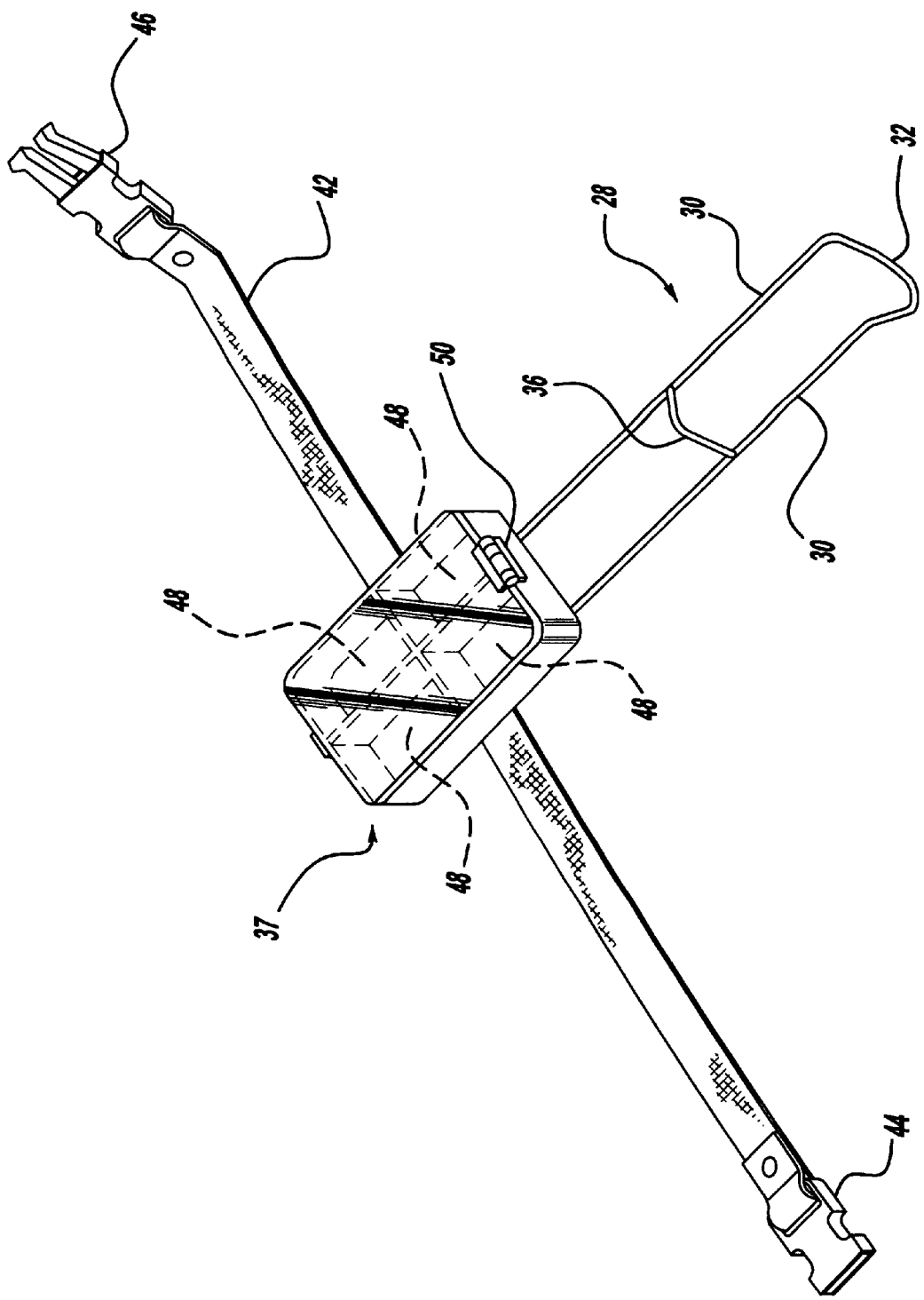
FIG. 2 is a perspective view of the device for holding an ice fishing rod of FIG. 1 showing the container with its lid removed.
Figure 3:
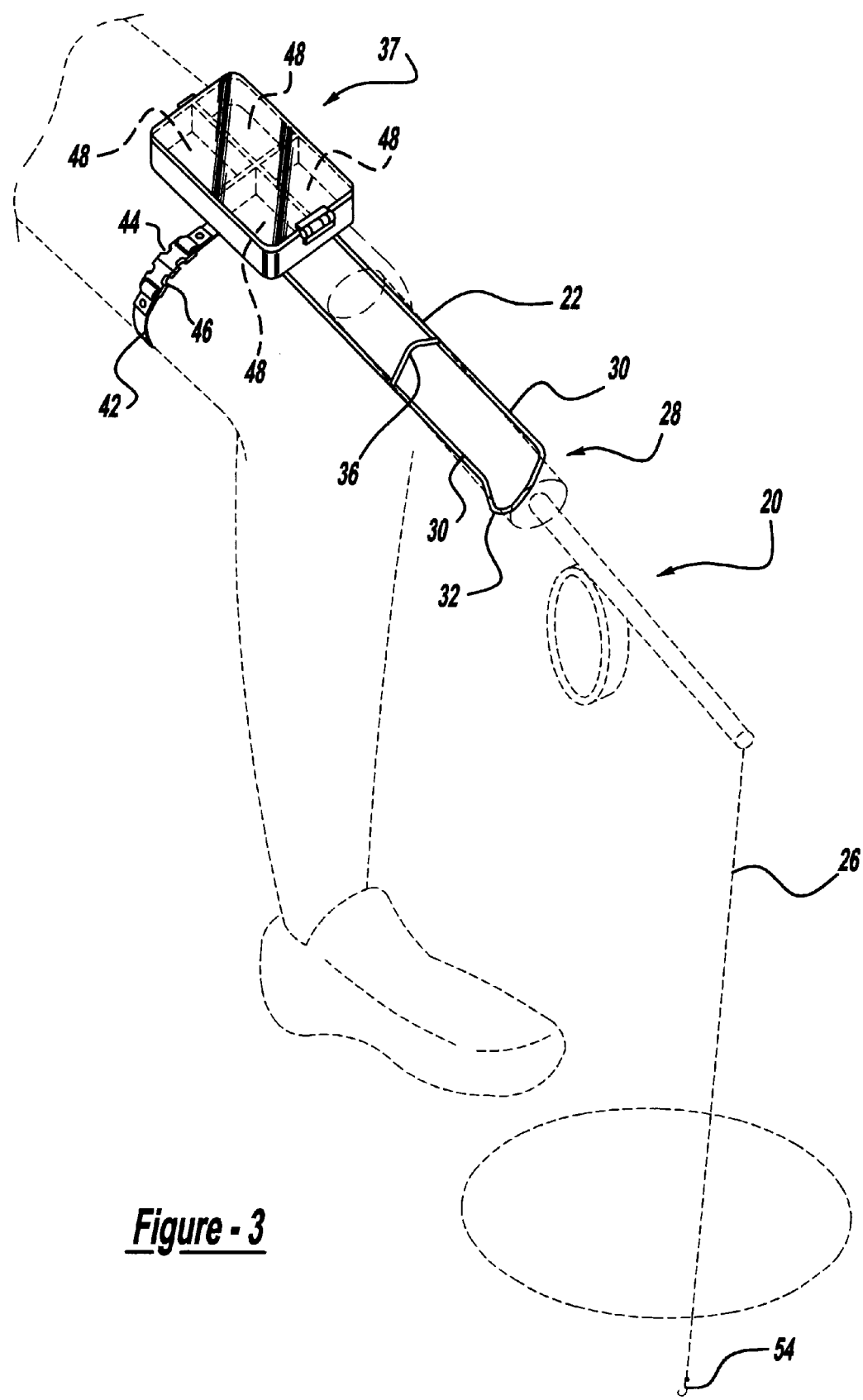
FIG. 3 is a perspective view of the device for holding an ice fishing rod of FIG. 1 strapped to the anterior lower thigh of the fisherman showing the method of using the device for ice fishing.
Figure 4:
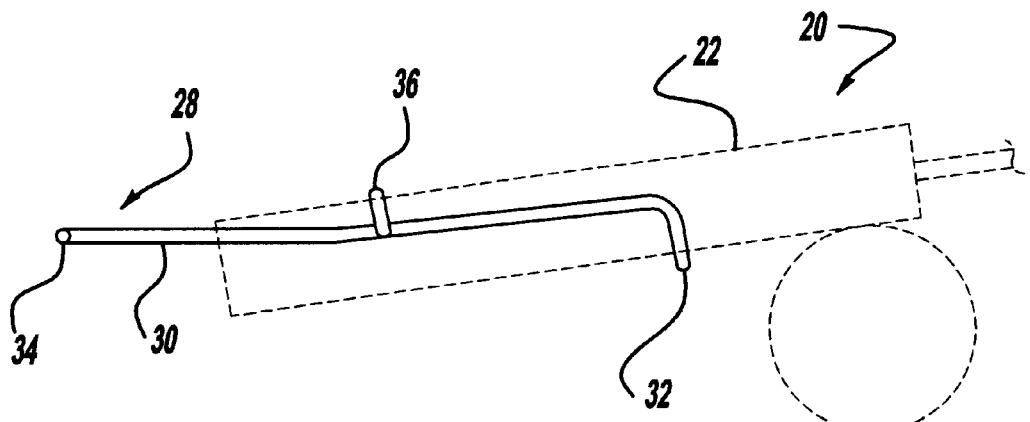
FIG. 4 is a side view of the rod holder of the device for holding an ice fishing rod of FIG. 1.

The preferred embodiment of this invention is comprised of a rod holder 28, a container 37, a rear bracket 38, a front bracket 40, a strap 42, a female buckle 44 and a male buckle 46.

Preferably the rod holder 28 is constructed from high carbon steel. It may also be molded from plastic. The rod holder 28 has two substantially parallel siderails 30. A front support member 32 is shaped to receive an ice fishing rod handle 22. The front support member 32 is attached to one end of each siderail 30. The other end of each siderail 30 has an ear 34 formed onto it for attaching the siderails 30 to a bracket. A rod alignment member 36, shaped to secure the fishing rod handle 22 near the distal end of the handle, is attached to the siderails 30. The rod alignment member 36 is shaped and positioned such that the siderails 30, the front support member 32 and the rod alignment member 36 will hold the ice fishing rod 20 at its handle 22 in a substantially horizontal position.

Preferably, the container 37 is molded from plastic. In the preferred embodiment of this invention the container 37 has a plurality of compartments 48. The compartments 48 are shaped and sized to hold fishing lures and fishing bait. The compartments 48 are also shaped and sized to permit the lures or bait to be easily grabbed by the fisherman's forefinger and thumb. Preferably the container 37 has four compartments 48. Each compartment 48 is approximately twice as long as it is wide. The long side of each compartment 48 is aligned parallel to the longitudinal axis of the fisherman's thigh. Preferably, the container 37 has a hinged lid 52. A hinge 50 is attached to the top of the container 37 at the distal end of the container 37 when the container 37 is placed upon the thigh of the fisherman and the longitudinal axis of the container 37 is aligned to he parallel with the longitudinal axis of the fisherman's thigh. The lid 52 is attached to the hinge 50.

Figure 5:
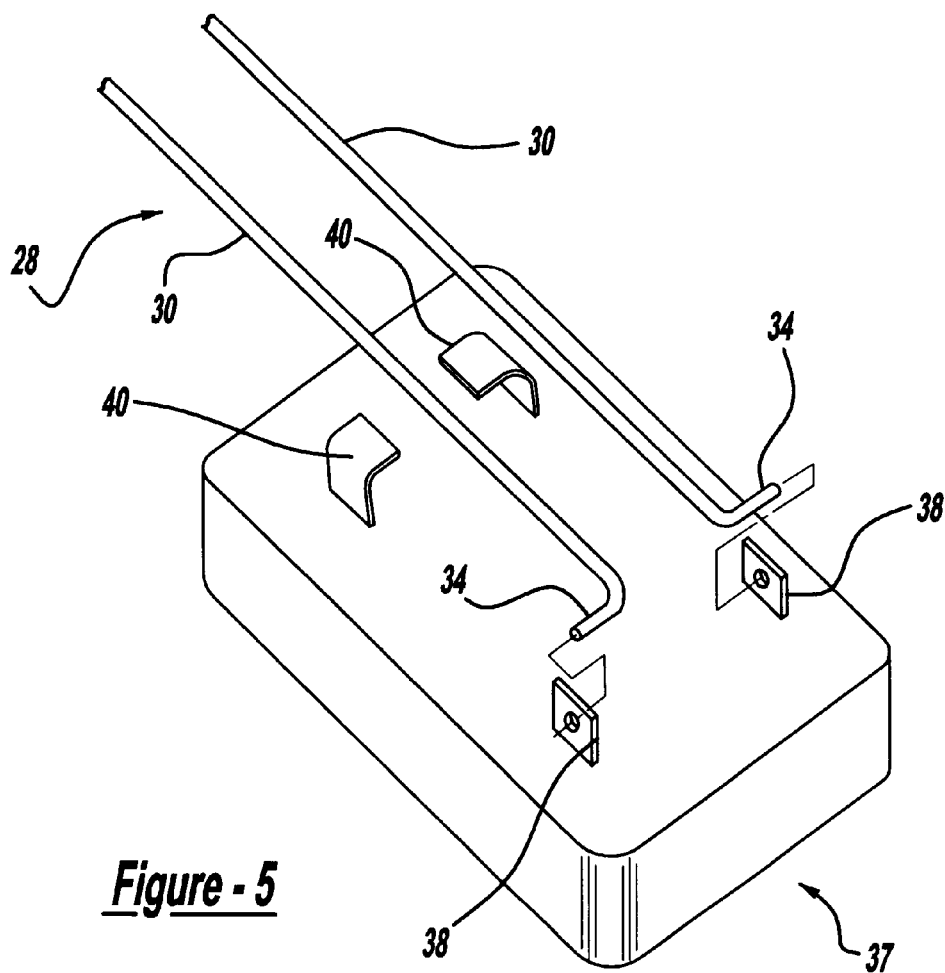
FIG. 5 is a bottom view of the device for holding an ice fishing rod of FIG. 1 showing the rod holder exploded from the container front and rear brackets.

A rear bracket 38 is molded into one end of the bottom side of the container 37. The rear bracket is positioned and shaped to receive the ears of 34 of the rod holder 38. The rear bracket 38 consists of two protruding elements as shown in FIG. 5. The rear bracket 38 secures the rod holder 28 to the container 37 at the siderail ears 34 of the rod holder 28. A front bracket 40 is molded into the other end of the bottom side of the container 37. The front bracket 40 consists of two protruding elements as shown in FIG. 5. The front bracket 40 is shaped and positioned to secure the rod holder 28 to the container 37 such that the rod holder 28 and the bottom of the container 37 are substantially coplanar.

A strap 42 of sufficient length to fit around the thigh of a fisherman is positioned between the rod holder 28 and the bottom of the container 37. The strap 42 is held in place by the proximity of the rod holder 28 to the container 37. A female buckle 44 is attached to one end of the strap 42. A male buckle 46 is attached to the other end of the strap 42. The male buckle 46 and female buckle 44 are positioned along the strap 42 such that the strap 42 will fit tightly along the thigh of the fisherman when the buckles are connected.

Preferably, the strap 42 is constructed from nylon. Preferably, the female buckle 44 and the male buckle 46 are constructed from plastic.

Typically, this invention will be used as follows. The strap 42 is placed between the container 37 and the rod holder 28. The rod holder 28 is secured to the container 37 by inserting the siderails 30 of the rod holder into the front bracket 40 and inserting the ears 34 of the siderails 30 into the rear bracket 38. The strap 42 is positioned between the rod holder 28 and the container 37 such that the strap 42 may be buckled tightly around the lower thigh of the fisherman while the container 37 sits atop the lower thigh of the fisherman. The container 37, with the rod holder 28 and strap 42 attached, is placed on top of the fisherman's thigh, preferably several inches above the knee. Usually, the fisherman will be sitting on top of a bucket or a chair placed upon the ice at this time. The longitudinal axis of the container 37 is aligned to be parallel with the longitudinal axis of the thigh of the fisherman. The female buckle 44 is then attached to the male buckle 46, thereby tightly securing the assembly to the fisherman's thigh. When the container and rod assembly are so secured, an ice fishing rod 20 may be inserted into the rod holder 28.

When the ice fishing rod 20 is secured within the rod holder 28, with the container 37 attached to the thigh of the fisherman, and the fisherman seated in a fishing position, the fisherman will have two hands free. The fisherman will be able to easily remove bait or lures from the container 37 and attach either of them to his or her fishing line 26. The fisherman is then ready to fish. He or she places the fishing line 26, with a lure or bait attached to it, into the water. The water is typically accessible by way of a hole cut through the surface ice. The fisherman may jig the fishing line by moving his or her leg. The use of hands is not needed. The relative position of the fishing rod to the fisherman's leg may be easily changed because the rod holder/container assembly easily pivots and moves along the leg of the fisherman.

Eventually, a successful fisherman catches a fish. When a fish bites, the hook 54 may be set by a quick lifting of the leg to which the rod is attached or by quickly lifting the fishing rod 20 by hand. Since the fishing rod holder 22 is designed to hold the fishing rod 20, the fisherman may place the fishing rod 20 back into the holder 22 after he reels the caught fish to the surface. This allows the use of both hands for removal of the fish from the hook 54 or lure attached to the fishing line 26.

After the fisherman has concluded fishing, he or she may have bait remaining within the container 37. The container 37 may be easily removed from the rod holder 28 and strap 42. The container 37 may then be stored in a refrigerator or other appropriate place for storing bait. The removability of the container 37 from the rod holder 28 and the strap 42 provides additional convenience when the fisherman changes fishing locations. The container 37 may be easily detached and placed within a pocket of the fisherman's clothing while the fisherman moves to another fishing location.

What is claimed is:

1. A device for holding an ice fishing rod, the device comprising:
   (a) a rod holder comprising:
      (i) two substantially parallel siderails;
      (ii) a front support member shaped to receive the ice fishing rod handle, the front support member being attached to one end of each siderail;
      (iii) an ear formed onto the other end of each siderail for attaching the siderails to a bracket; and
      (iv) a rod alignment member shaped to secure the ice fishing rod handle near the distal end of the handle, the rod alignment member being attached to the siderails such that the siderails, the front support member and the rod alignment member will securely hold an ice fishing rod at its handle in a substantially horizontal position;
   (b) a container, shaped to fit to the thigh of a fisherman;
   (c) a rear bracket attached to one end of the bottom side of the container securing the rod holder, at its ears, to the container and rear bracket;
   (d) a front bracket attached to the other end of the bottom side of the container securing the rod holder to the container such that the rod holder and the bottom of the container are substantially coplanar;
   (e) a strap of sufficient length to fit around the thigh of the fisherman, positioned between the rod holder and the bottom of the container;
   (f) a female buckle attached to one end of the strap; and
   (g) a male buckle attached to the other end of the strap for connecting to the female buckle and securing the strap, rod holder and container to the thigh of the fisherman.

2. The device for holding an ice fishing rod recited in claim 1, wherein the container, the rear bracket attached to one end of the bottom side of the container and the front bracket attached to the other end of the bottom side of the container are one integral piece.

3. The device for holding an ice fishing rod recited in claim 1, wherein the container has a hinged lid and a plurality of compartments.

4. The device for holding an ice fishing rod recited in claim 2, wherein the container has a hinged lid and a plurality of compartments.

* * * * *